US012542989B2

(12) United States Patent
Osborne et al.

(10) Patent No.: US 12,542,989 B2
(45) Date of Patent: Feb. 3, 2026

(54) SOUND SYSTEM FOR A REFRIGERATOR APPLIANCE

(71) Applicant: Haier US Appliance Solutions, Inc., Wilmington, DE (US)

(72) Inventors: Christopher Hayward Osborne, Louisville, KY (US); Timothy Ray Jackson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 233 days.

(21) Appl. No.: 18/486,360

(22) Filed: Oct. 13, 2023

(65) Prior Publication Data

US 2025/0126383 A1 Apr. 17, 2025

(51) Int. Cl.
*H04R 1/02* (2006.01)
*F25D 23/02* (2006.01)
*F25D 23/12* (2006.01)

(52) U.S. Cl.
CPC ........... *H04R 1/028* (2013.01); *F25D 23/028* (2013.01); *F25D 23/126* (2013.01); *H04R 1/025* (2013.01)

(58) Field of Classification Search
CPC ........... H04R 1/025; H04R 1/028; F25C 5/22; F25D 23/028; F25D 23/126
USPC .......................................................... 222/192
See application file for complete search history.

(56) References Cited

U.S. PATENT DOCUMENTS

| | | | |
|---|---|---|---|
| 7,686,127 | B2 | 3/2010 | LeClear et al. |
| 10,429,124 | B2 | 10/2019 | Seo et al. |
| 2011/0259033 | A1 | 10/2011 | Froehlich |
| 2022/0303652 | A1 | 9/2022 | Kim et al. |

FOREIGN PATENT DOCUMENTS

| | | | |
|---|---|---|---|
| AU | 2019222944 | B2 | 7/2021 |
| JP | 7159781 | B2 * | 10/2022 |
| KR | 100582082 | B1 | 5/2006 |
| KR | 100764279 | B1 | 10/2007 |
| KR | 100833304 | B1 | 5/2008 |
| KR | 20080057639 | A | 6/2008 |
| KR | 101245886 | B1 | 3/2013 |
| KR | 102196161 | B1 | 12/2020 |
| WO | WO2017039296 | A1 | 3/2017 |
| WO | WO2019198281 | A1 | 10/2019 |

* cited by examiner

*Primary Examiner* — Jennifer C Chiang
(74) *Attorney, Agent, or Firm* — Dority & Manning, P.A.

(57) ABSTRACT

A refrigerator appliance includes a cabinet defining a chilled chamber, a door being rotatably mounted to the cabinet to provide selective access to the chilled chamber, a dispensing assembly mounted to the door and defining a dispenser recess, a control panel mounted to a front of the door, and a speaker assembly mounted within the door behind the control panel, wherein the speaker assembly comprises a speaker that is oriented downward along the vertical direction into the dispenser recess.

20 Claims, 5 Drawing Sheets

SOUND SYSTEM FOR A REFRIGERATOR APPLIANCE

FIELD OF THE INVENTION

The present subject matter relates generally to refrigerator appliances, and more particularly to sound systems for refrigerator appliances.

BACKGROUND OF THE INVENTION

Refrigerator appliances generally include a cabinet that defines one or more chilled chambers for receipt of food articles for storage. Typically, one or more doors are rotatably hinged to the cabinet to permit selective access to food items stored in the chilled chamber. Further, refrigerator appliances commonly include ice making assemblies mounted within an icebox on one of the doors or in a freezer compartment. The ice is stored in a storage bin and is accessible from within the freezer chamber or may be discharged through a dispenser recess defined on a front of the refrigerator door.

Conventional refrigerator appliances may include one or more speakers or audible chime indicators for communicating operating statuses to a consumer. For example, if the consumer fails to fully shut the refrigerator door, a chime may sound to notify the consumer. However, conventional refrigerator audio devices are small, low power devices that have limited operating frequencies and poor audio quality. Moreover, space restrictions within confined spaces of conventional refrigerator appliances limit the ability to use larger, higher quality speakers. Accordingly, conventional refrigerators have limited audio capabilities. Moreover, conventional audio devices are positioned in the refrigerator such that the generated sound has poor quality, e.g., particularly at high frequencies.

Accordingly, a refrigerator appliance with improved audio features would be desirable. More particularly, a high quality, high power speaker assembly for use within a dispensing assembly of a refrigerator appliance would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance defining a vertical direction, a lateral direction, and a transverse direction is provided. The refrigerator appliance includes a cabinet defining a chilled chamber, a door being rotatably mounted to the cabinet to provide selective access to the chilled chamber, a dispensing assembly mounted to the door and defining a dispenser recess, a control panel mounted to a front of the door, and a speaker assembly mounted within the door behind the control panel, wherein the speaker assembly comprises a speaker that is oriented downward along the vertical direction into the dispenser recess.

In another exemplary embodiment, a dispensing assembly for a refrigerator appliance is provided. The refrigerator appliance includes a door and defining a vertical direction, a lateral direction, and a transverse direction. The dispensing assembly includes a dispenser recess defined at least in part by a back wall, two sidewalls, and two arcuate corners that join the back wall to the two sidewalls, a control panel mounted within the dispenser recess proximate a front of the door, and a speaker assembly mounted within the door behind the control panel, wherein the speaker assembly comprises a speaker that is oriented downward along the vertical direction into the dispenser recess.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
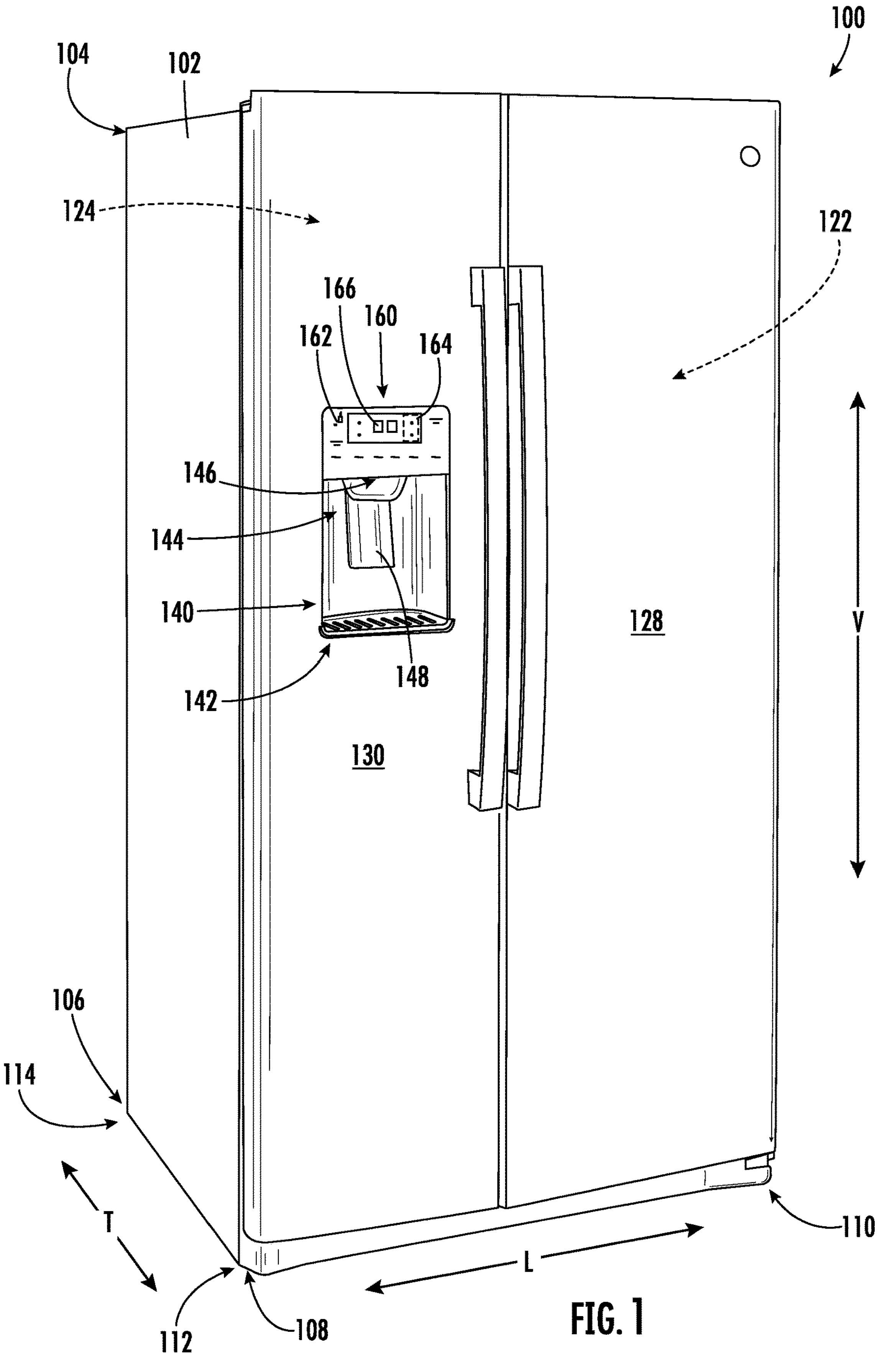
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent second side 110 of housing 102 and a freezer chamber 124 arranged at or adjacent first side 108 of housing 102. As such, refrigerator appliance 100 is generally referred to as a side-by-side refrigerator. It is recognized, however, that the benefits of the present disclosure apply to other types and styles of refrigerator appliances such as, e.g., a top mount refrigerator appliance, a bottom mount refrigerator appliance, or a single door refrigerator appliance. Consequently, the description set forth herein is for illustrative purposes only and is not intended to be limiting in any aspect to any particular refrigerator chamber configuration.

A refrigerator door 128 is rotatably hinged to an edge of housing 102 for selectively accessing fresh food chamber 122. In addition, a freezer door 130 is rotatably hinged to an edge of housing 102 for selectively accessing freezer chamber 124. Refrigerator door 128 and freezer door 130 are shown in the closed configuration in FIG. 1. One skilled in the art will appreciate that other chamber and door configurations are possible and within the scope of the present invention.

Figure 2:
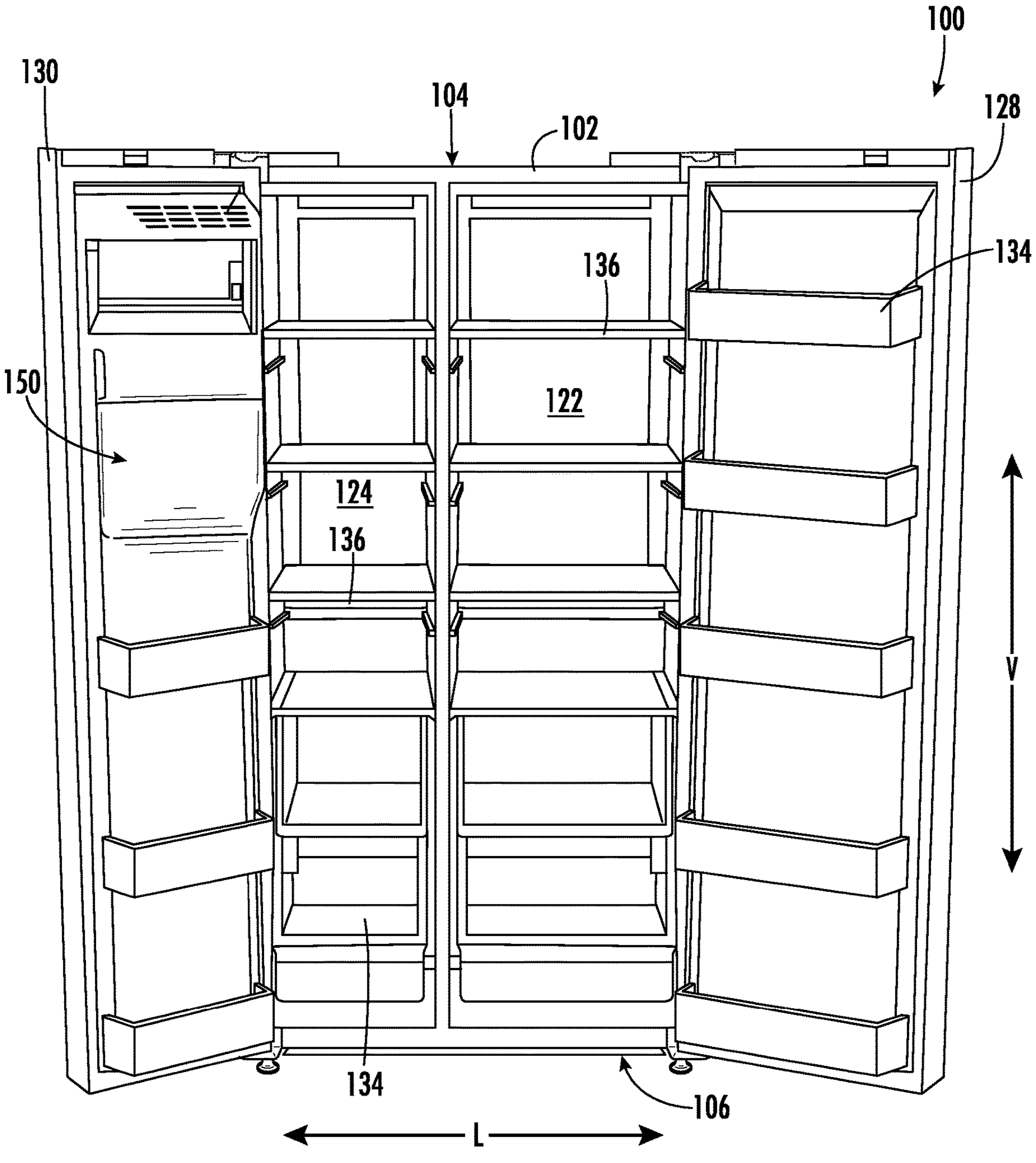
FIG. 2 provides a perspective view of the exemplary refrigerator appliance of FIG. 1, with the doors of the fresh food chamber and freezer chamber shown in an open position.
Figure 3:
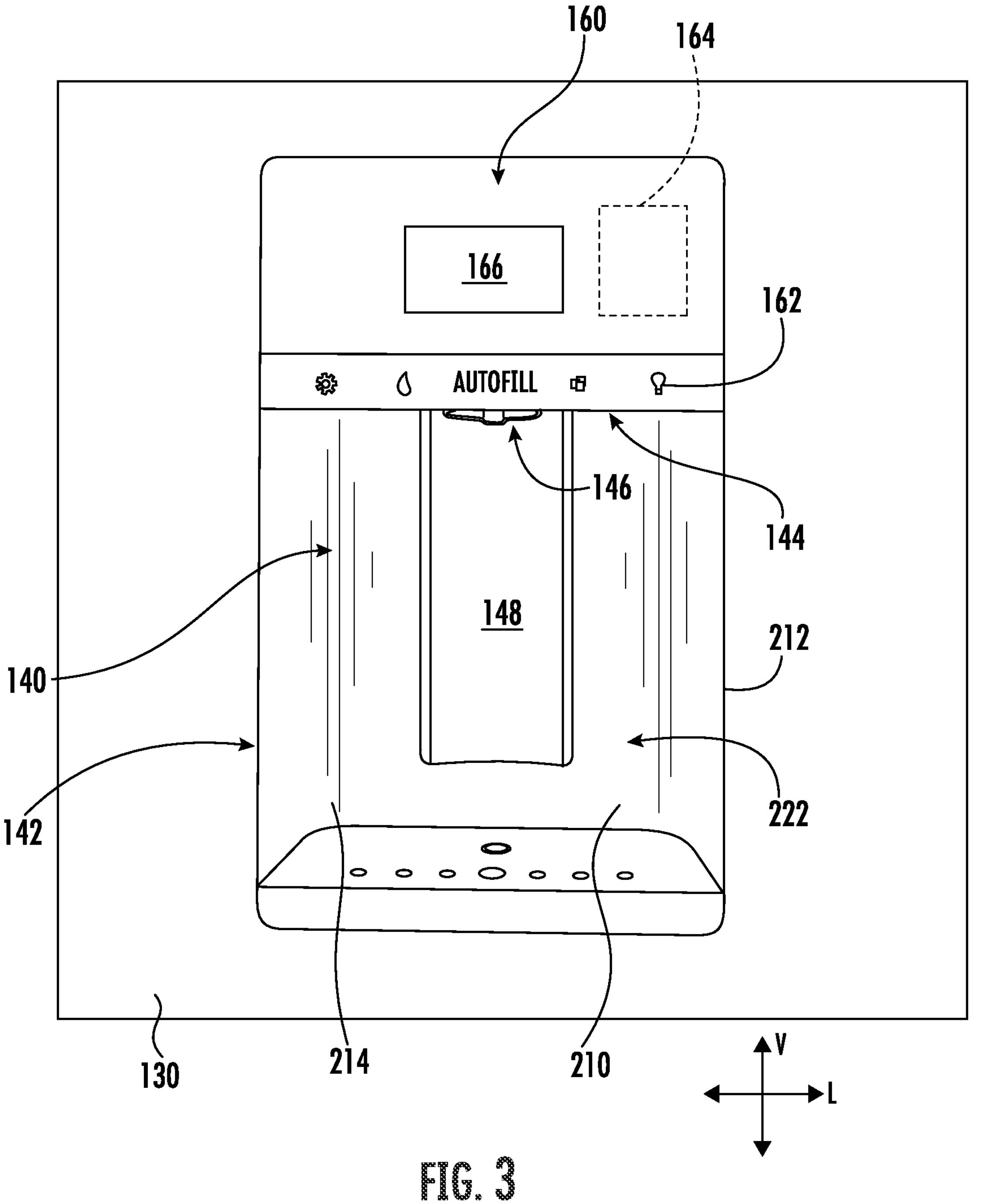
FIG. 3 provides a close-up view of a dispensing assembly of the exemplary refrigerator appliance of FIG. 1 according to an exemplary embodiment of the present subject matter.
Figure 4:
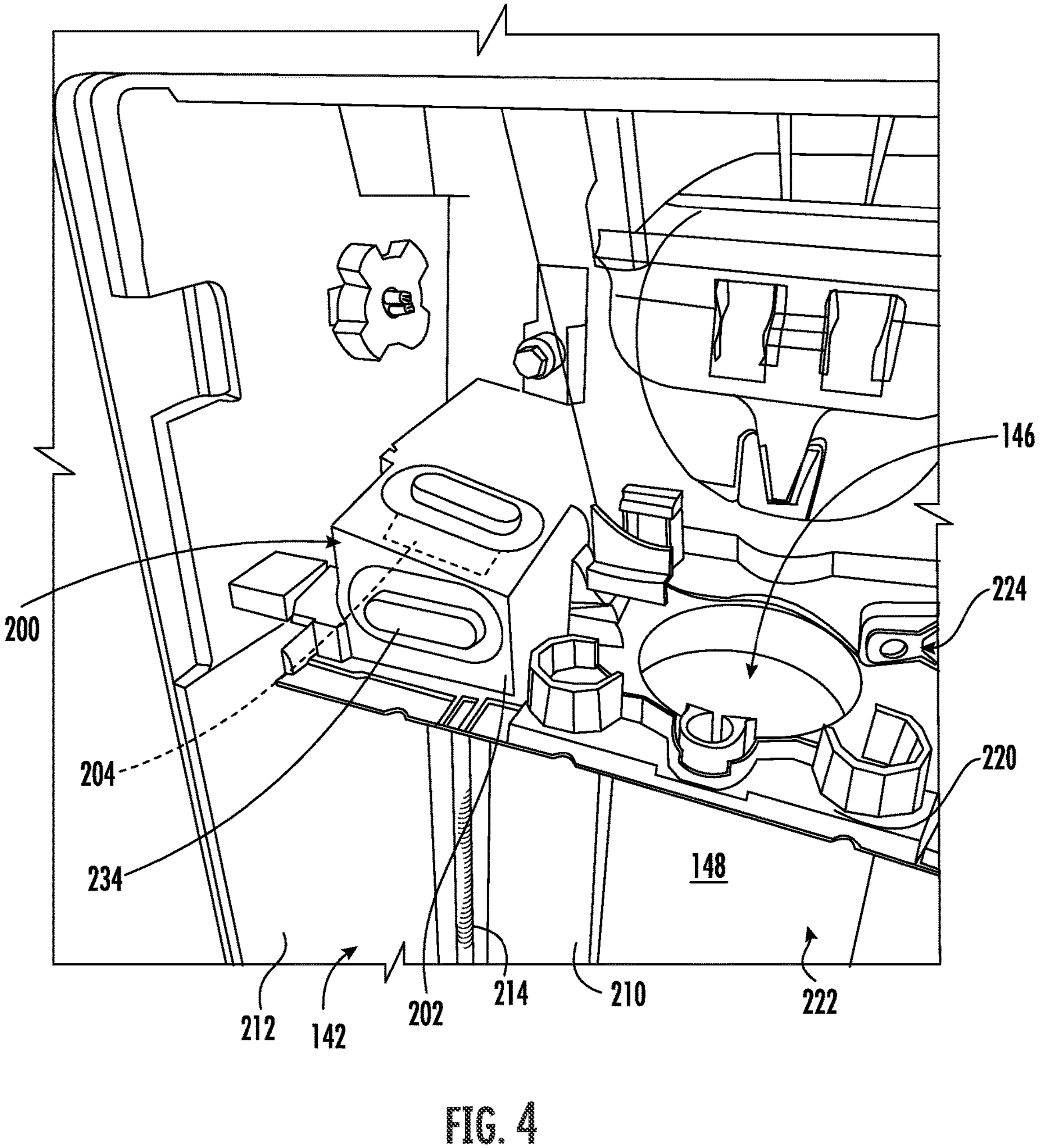
FIG. 4 provides a top, perspective view of the example dispensing assembly of FIG. 3 with a control panel removed according to an exemplary embodiment of the present subject matter.
Figure 5:
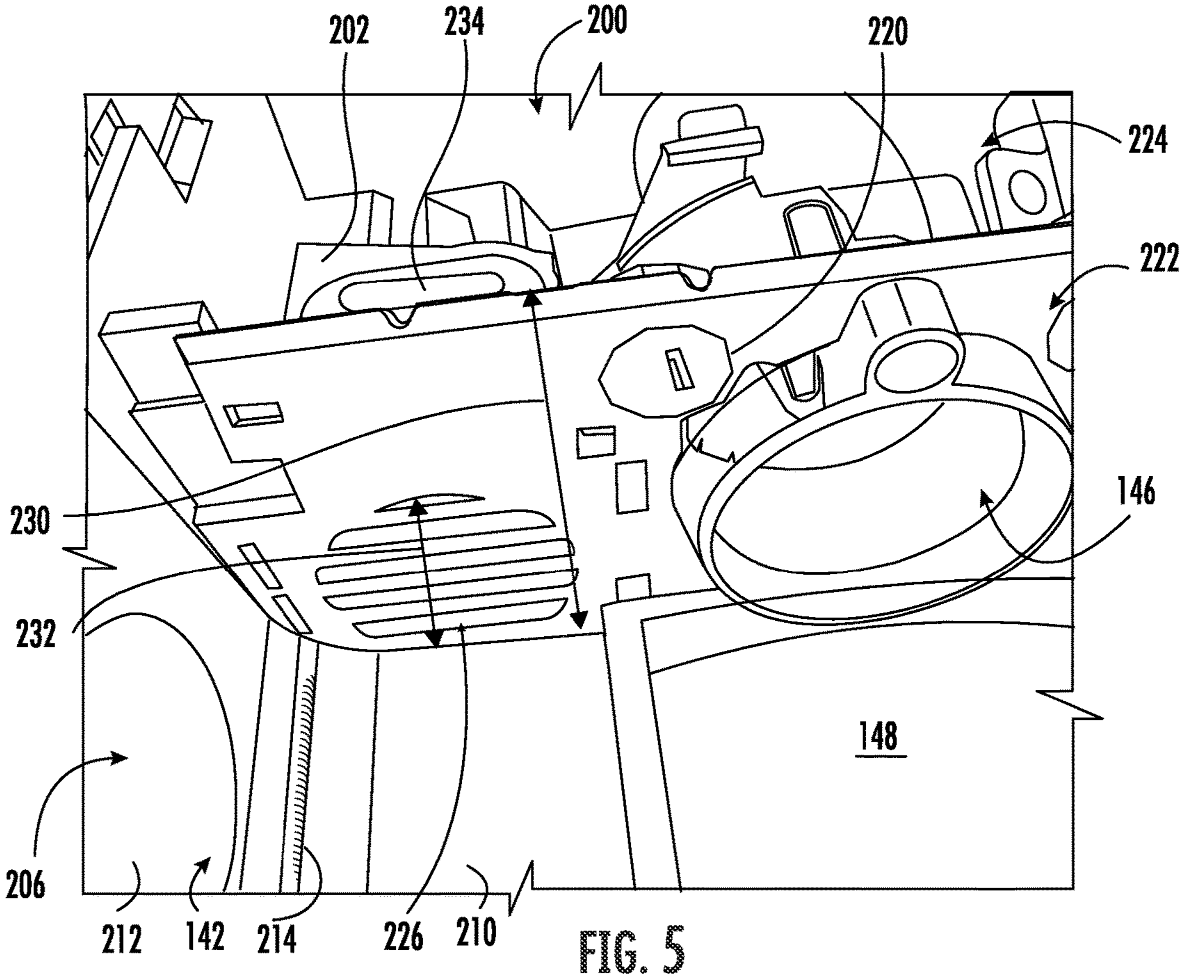
FIG. 5 provides a bottom, perspective view of the example dispensing assembly of FIG. 3 with the control panel removed according to an exemplary embodiment of the present subject matter.

FIG. 2 provides a perspective view of refrigerator appliance 100 shown with refrigerator door 128 and freezer door 130 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator door 128 and freezer door 130 or may slide into a receiving space in fresh food chamber 122 or freezer chamber 124. It should be appreciated that the illustrated storage components are used only for the purpose of explanation and that other storage components may be used and may have different sizes, shapes, and configurations.

Referring now generally to FIG. 1, a dispensing assembly 140 will be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on freezer door 130. In this regard, dispenser recess 142 is defined on a front side 112 of refrigerator appliance 100 such that a user may operate dispensing assembly 140 without opening freezer door 130. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142.

As shown in FIG. 2, inside refrigerator appliance 100, freezer door 130 may define an icebox 150 housing an icemaker and an ice storage bin that are configured to supply ice to dispenser recess 142. In this regard, for example, icebox 150 may define an ice making chamber for housing an ice making assembly, a storage mechanism, and a dispensing mechanism. Illustration and discussion of these features are omitted here for brevity.

A control panel 160 is provided for controlling the mode of operation. For example, control panel 160 includes one or more selector inputs 162, such as knobs, buttons, touch-screen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate refrigerator appliance 100 and dispensing assembly 140 in response to selector inputs 162. Additionally, a display 166, such as an indicator light or a screen, may be provided on control panel 160. Display 166 may be in communication with controller 164, and may display information in response to signals from controller 164.

As used herein, “processing device” or “controller” may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 5, a speaker assembly 200 that may be used with refrigerator appliance 100 will be described according to exemplary embodiments of the present subject matter. Specifically, as will be described in more detail below, speaker assembly 200 and dispenser recess 142 are designed to achieve a desired or targeted acoustic response (e.g., as shown for example in FIG. 6). Notably, as explained above, conventional refrigerator speakers or audio devices are small, low-power, and limited frequency devices incapable of providing rich audio content as facilitated by a speaker assembly 200. Moreover, conventional refrigerator appliances have limited space for receiving higher-quality speakers and have speakers oriented in a manner that generates less than desirable audio response or sound quality.

According to an example embodiment, speaker assembly 200 may generally include a speaker box for housing 202 that contains a speaker driver 204 including a sound producing speaker cone 206. According to the illustrated embodiment, speaker assembly 200 is positioned within dispenser recess 142 and is covered up by control panel 160. Specifically, speaker housing 202 may be concealed by control panel 160 for improved aesthetics. In addition to aesthetics, when control panel 160 is in place it further modifies the resulting audio output shaping it into the more desired response. In addition, according to an example embodiment, speaker assembly 200 and sound producing speaker cone 206 may generally be directed downward along the vertical direction V into dispenser recess 142. Notably, the downward orientation of speaker assembly 200 may generate some audio issues particularly at high frequencies (e.g., such as reduce high frequency output or performance). Accordingly, aspects of the present subject matter are generally directed to an improved design of dispenser recess 142 in conjunction with the high-quality speaker assembly 200 to produce a synergistic effect with improved overall audio quality across the entire audible spectrum (e.g., between 20 Hz to about 20 kHz). Although speaker assembly 200 is illustrated and described herein as including a single speaker, it should be appreciated that speaker assembly 200 may include any suitable number, type, configuration, and positioning of speakers while remaining within the scope of the present subject matter.

Specifically, according to the illustrated embodiment, dispenser recess 142 may be specifically designed to facilitate an improved noise response from speaker assembly 200. In this regard, the geometry of dispenser recess 142 may act as a parabolic reflector, a sounding board, or a noise reflector particularly suited for improving the frequency response, recovering some of the high frequency output that would normally be lost by orienting the speaker downward and 90 degrees from the axis of the listener, etc. Specifically, according to an example embodiment, dispenser recess 142 may generally be defined by a back wall 210, sidewalls 212, and two arcuate corners 214 that join back wall 210 to sidewalls 212.

Specifically, as illustrated, back wall 210 may generally be a flat wall extending in a plane defined by the vertical direction V and the lateral direction L. Similarly, sidewalls 212 may generally be flat walls extending in a plane defined by the vertical direction V and the transverse direction T. Arcuate corners 214 may wrap around an axis defined by the vertical direction V to join backwall 210 to sidewalls 212. Notably, the orientation of speaker assembly 200 in conjunction with the geometry of dispenser recess 142 may provide a particularly suitable sound response, e.g., as described below and illustrated in FIG. 6.

Notably, the positioning of speaker assembly 200 within dispenser recess 142 may be important for determining the appropriate sound response of speaker assembly 200. For example, as illustrated, refrigerator appliance 100 may include a separator panel 220 that divides dispenser recess 142 into a dispensing region 222 and a mechanical compartment 224. In this regard, separator panel 220 may generally extend within a horizontal plane (e.g., defined by the lateral direction L and the transverse direction T). Dispensing region 222 may be positioned below separator panel 220, e.g., and may include actuating mechanism 148 and a space for receiving cups. By contrast, mechanical compartment 224 may be positioned above separator panel 220 and may be covered by control panel 160. Speaker assembly 200 may be positioned within mechanical compartment 224 and separator panel 220 may define a plurality of apertures 226 through which sound may pass into dispensing region 222.

According to an example embodiment, dispenser recess 142 may generally define a recess depth 230 that is measured along the transverse direction T from back wall 210 to a front side 112 of refrigerator appliance 100. According to an example embodiment, speaker assembly 200 may be positioned within a back half of recess depth 230. In this regard, for example, apertures 226 defined in separator panel 220 may be positioned entirely within the back half or rearmost portion of dispenser recess 142. According to still other embodiments, speaker assembly 200 may be located within the back corner of recess depth 230. In this manner, sound generated by speaker assembly 200 may generally be propagated in line with or along the backwall 210.

In addition, speaker assembly 200 may be generally sized to generate the desired amount and frequency of sound within dispenser recess 142. For example, according to an example embodiment, speaker assembly 200 may generally define a speaker depth 232 that is measured along the transverse direction T. According to an example embodiment, speaker depth 232 may be between about one quarter and three quarters of recess depth 230 or about one half of recess depth 230.

In addition, it may be desirable to position speaker assembly 200 within one of arcuate corners 214. In this regard, as illustrated, speaker assembly 200 may generally be positioned between sidewall 212 and actuating mechanism 148. More specifically, speaker assembly 200 may be tucked into arcuate corner 214. Again, this positioning of speaker assembly 200 and/or apertures 226 may generally facilitate sound travel along the walls defining dispenser recess 142 in a manner that produces an improved acoustic response. To further improve the audio response generated by speaker assembly 200, speaker assembly 200 may include a plurality of passive sound radiators 234 that are positioned within dispenser recess 142. Various other alternate enclosure options are possible and within the scope of the present subject matter, such as vented or sealed enclosures, or a variety of other speaker alignments.

Figure 6:
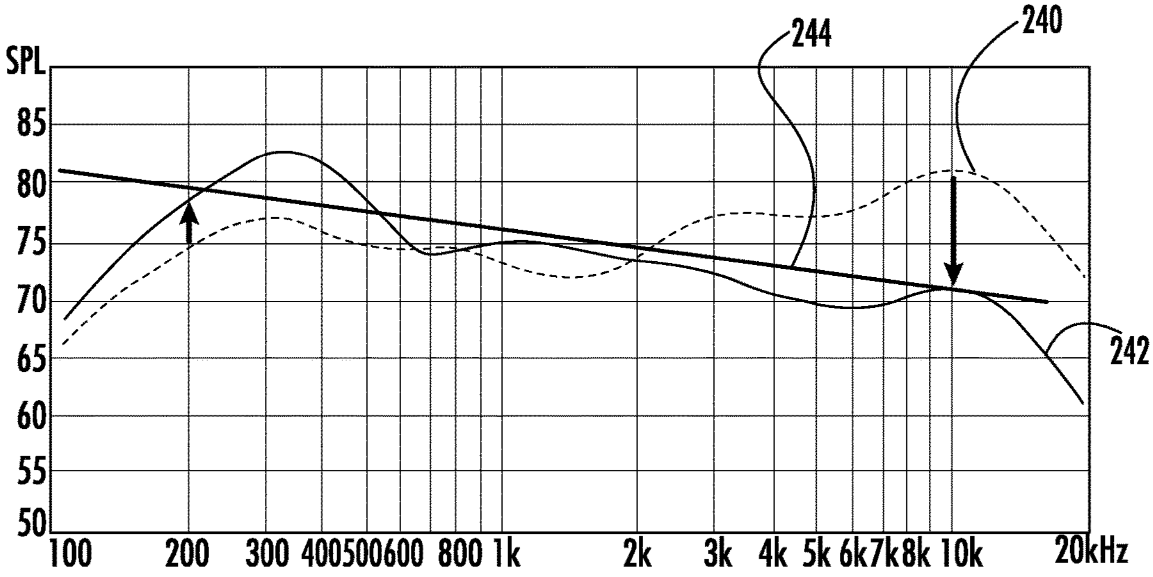
FIG. 6 provides a plot of an audio response generated by a speaker assembly of the exemplary refrigerator appliance of FIG. 1 according to an exemplary embodiment of the present subject matter.

Notably, speaker assembly 200 may generally have a larger power than conventional refrigerator audio indicators. For example, speaker assembly 200 may have a power level that is greater than 3 watts, greater than 5 watts, or greater, e.g., such as between about 6 and 8 watts. In addition, speaker assembly 200 may be designed to generate a frequency range over the entire audible spectrum, e.g., between about 20 Hz and 20 kHz. For example, speaker assembly 200 may have a frequency range of between about 100 Hz and 18 kHz. Moreover, as best shown in FIG. 6, line 240 may generally indicate the frequency response of speaker assembly 200 standing alone and directed toward a testing microphone. As shown, the acoustic response provides a lower low frequency response and a rising response at higher frequencies. By contrast, line 242 may generally indicate the frequency response of speaker assembly 200 when installed in dispenser recess 142 as described herein. Notably, line 244 may generally be representative of a desired frequency response for human hearing. In this regard, humans typically prefer to hear a 10 decibel reduction in frequency response gradually over the audible spectrum of 20 Hz to 20 kHz. As shown in FIG. 6, the present design of speaker assembly 200 and dispenser recess 142 may achieve this decibel reduction over the audible spectrum.

As explained herein, aspects of the present subject matter are generally directed to a compact speaker designed to fit in a refrigerator door dispenser recess area wherein the speaker is oriented such that the sound producing cone is faced down into the dispenser area. For example, the speaker is oriented 90 degrees off-axis from the listener such that the high frequencies are reduced and it creates a natural system equalization to provide a more desirable acoustic response without using electronic filters. In addition, the dispenser recess may be designed to have a sound directing geometry that is complementary to the speaker.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, comprising:
- a cabinet defining a chilled chamber;
- a door being rotatably mounted to the cabinet to provide selective access to the chilled chamber;
- a dispensing assembly mounted to the door and defining a dispenser recess;
- a control panel mounted to a front of the door; and
- a speaker assembly mounted within the door behind the control panel, wherein the speaker assembly comprises a speaker that is oriented downward along the vertical direction into the dispenser recess.

2. The refrigerator appliance of claim 1, wherein the dispenser recess defines a recess depth measured along the transverse direction, and wherein the speaker is located within a back half of the recess depth.

3. The refrigerator appliance of claim 2, wherein the speaker is located within a back quarter of the recess depth.

4. The refrigerator appliance of claim 2, wherein the speaker assembly defines a speaker depth equal to about half of the recess depth.

5. The refrigerator appliance of claim 1, wherein the dispenser recess is defined at least in part by a back wall, two sidewalls, and two arcuate corners that join the back wall to the two sidewalls.

6. The refrigerator appliance of claim 5, wherein the speaker assembly is positioned at least partially within one of the two arcuate corners.

7. The refrigerator appliance of claim 1, wherein the dispensing assembly comprises an actuation mechanism, and wherein the speaker assembly is positioned between the actuation mechanism and a sidewall of the dispenser recess.

8. The refrigerator appliance of claim 1, wherein the speaker assembly comprises:
- a sound producing speaker cone that is oriented parallel to the vertical direction.

9. The refrigerator appliance of claim 1, wherein the speaker assembly has a power level of greater than 5 watts.

10. The refrigerator appliance of claim 1, wherein the speaker assembly has a power level of between about 6 and 8 watts.

11. The refrigerator appliance of claim 1, wherein the speaker assembly has a frequency range of between 100 Hz to 18 kHz.

12. The refrigerator appliance of claim 1, wherein the speaker assembly exhibits a 10 dB reduction in frequency response over an audible spectrum of 20 Hz to 20 KHz.

13. The refrigerator appliance of claim 1, wherein the speaker assembly further comprises:
- a plurality of passive sound radiators positioned within the dispenser recess.

14. A dispensing assembly for a refrigerator appliance, the refrigerator appliance comprising a door and defining a vertical direction, a lateral direction, and a transverse direction, the dispensing assembly comprising:
- a dispenser recess defined at least in part by a back wall, two sidewalls, and two arcuate corners that join the back wall to the two sidewalls;
- a control panel mounted within the dispenser recess proximate a front of the door; and a speaker assembly mounted within the door behind the control panel, wherein the speaker assembly comprises a speaker that is oriented downward along the vertical direction into the dispenser recess.

15. The dispensing assembly of claim 14, wherein the dispenser recess defines a recess depth measured along the transverse direction, and wherein the speaker is located within a back half of the recess depth.

16. The dispensing assembly of claim 14, wherein the dispenser recess defines a recess depth measured along the transverse direction, and wherein the speaker assembly defines a speaker depth equal to about half of the recess depth.

17. The dispensing assembly of claim 14, wherein the speaker assembly is positioned at least partially within one of the two arcuate corners.

18. The dispensing assembly of claim 14, wherein the speaker assembly has a power level of between about 6 and 8 watts.

19. The dispensing assembly of claim 14, wherein the speaker assembly has a frequency range of between 100 Hz to 18 kHz.

20. The dispensing assembly of claim 14, wherein the speaker assembly exhibits a 10 dB reduction in frequency response over an audible spectrum of 20 Hz to 20 kHz.

* * * * *